Patented Sept. 13, 1949

2,481,854

UNITED STATES PATENT OFFICE 2,481,854

COMPOSITION TO BLACKEN SURFACES OF COPPER AND OF ALLOYS CONTAINING COPPER

James Douglas MacMahon, Niagara Falls, N. Y., assignor, by mesne assignments, to Enthone, Inc., New Haven, Conn., a corporation of Connecticut No Drawing. Application February 14, 1946, Serial No. 647,659

3 Claims. (Cl. 148—6.14)

My invention relates to a solid composition comprising an alkali metal chlorite and an alkali metal hydroxide combined in a novel manner. The composition is particularly valuable for use in aqueous solution to blacken copper and alloys containing copper. Thus, it finds application in the manufacture of range finders, periscopes, binoculars, and other optical devices having copper or copper alloy parts or elements which unless suitably coated may give rise to undesirable secondary reflection, shadow images, etc.

The blackening of copper surfaces with aqueous solutions containing sodium or potassium hydroxide and sodium or potassium chlorite has been previously disclosed. In such process the solution is best employed hot, temperatures near its boiling point usually being advantageous. Using sodium hydroxide and sodium chlorite, satisfactory deep black coatings can be obtained, for example, from solutions having concentrations within the limits: 5 g./l. sodium chlorite—10 g./l. sodium hydroxide to saturated solution sodium chlorite—1000 g./l sodium hydroxide. The lower range of concentration requires approximately thirty minutes to blacken a pure copper surface with the solution operated at its boiling point, while the surface blackens in approximately one minute in solutions of the higher concentrations, similarly operated.

Although practitioners of the described process may obviously maintain separate supplies of the chlorite and hydroxide for making up the coating solution or bath, such practice is somewhat hazardous to operating personnel as the chlorites unmixed with alkali are explosive on percussion in the presence of organic matter and tend to increase the inflammability of fabrics when permitted to remain in contact therewith. The use of separate supplies of chlorite and hydroxide is further disadvantageous because of the mistakes which are sometimes made in the weighing procedures.

The preparation of satisfactory solid mixtures of chlorite and caustic in divided form has presented a considerable problem because unless the particle sizing of the two chemicals is substantially identical there is a tendency toward segregation which is manifestly undesirable. Uniform particle sizing can be achieved only by the most strict processing control and such control increases costs. Moreover, even when achieved the effect may be lost through non-uniform attrition of the particles occurring as during shipment of the mixture.

In accordance with the present invention, I solve the problem presented by fixing the chlorite in the water of hydration of the caustic. That the problem could be thus solved was surprising since one would expect that this procedure would lead to material decomposition of the chlorite either during preparation of the product or on subsequent storage.

I generally practice my invention using sodium chlorite and sodium hydroxide but the corresponding potassium compounds or mixtures may be used. It is not necessary that the sodium chlorite be of highest quality. Thus, I have used technical sodium chlorite of the following analysis with excellent results:

| | Per cent |
|---|---|
| Sodium chlorite | 81 |
| Sodium carbonate | 3 |
| Sodium chloride | 6 |
| Sodium chlorate | 4 |
| Water | 6 |
| | 100 |

While particularly valuable for use in copper-blackening my composition is not limited to such application. Also, it should be understood that the composition may be made up to contain in addition to chlorite and caustic other materials compatible therewith and which, in a particular application, serve to modify or promote the action of the chlorite and/or caustic. In copper-blackening the inclusion of from about 1–2% anhydrous trisodium phosphate has been found advantageous. Further improvement may be had in some cases by the inclusion of a like amount of a compatible surface active agent such as a sodium alkyl sulfonate or a sodium alkyl aryl sulfonate.

The relative amounts of chlorite, caustic and water in my composition may be varied depending on the purpose to which the composition is to be put, but the weight of the caustic should always exceed the weight of the chlorite. When prepared for copper blackening the composition is usually made up to comprise the caustic and chlorite in about 2:1 ratio. In general, I consider any composition conforming to the limits indicated below as being within the scope of my invention.

| | Per cent |
|---|---|
| Caustic | 45–80 |
| Water | 15–25 |
| Chlorite | 5–30 |

Usually I prepare the composition in flaked form but it may be cast into briquettes, if desired. Flexible molds of rubber or similar material are advantageous in forming the briquettes.

The detailed practices of my invention will be readily understood from the examples below. The technical sodium chlorite used in the work on which the examples are based had the analysis given above.

Example 1

30 parts by weight of technical sodium chlorite was dissolved in 20 parts of water and the solution added to 50 parts of anhydrous sodium hydroxide flakes. The mixture was heated to 120° C. and the resulting homogeneous mass poured onto a cold surface where it solidified. It was then broken into flakes.

Example 2

25 parts of technical sodium chlorite was dissolved in 17.7 parts of water and the solution added to 57.3 parts of anhydrous sodium hydroxide. The mixture was heated to 130° C. and then cooled and flaked as described in Example 1. The product analysed 24.87% technical $NaClO_2$ or 20.14% pure $NaClO_2$. The analysis was the same after 11 months storage.

Example 3

Sodium chlorite was added to a cell liquor to obtain a mixture consisting of 54 parts of sodium hydroxide, 23 parts of technical sodium chlorite and 126 parts of water. Water was evaporated by gradually heating the mixture for about 3½ hours to a final temperature of 150° C. The mixture was then poured onto a cold surface to cool. Upon analysis after flaking it showed a content of 54.8% of sodium hydroxide, 23.2% of technical sodium chlorite and 22% (by difference) of water.

Example 4

30 parts of technical sodium chlorite were added to 100 parts by weight of 70% caustic soda and the mixture heated to 160° C. and held at such temperature for more than 30 minutes. Poured onto a cold surface and flaked the product showed an analysis 23% of technical sodium chlorite, 53.9% sodium hydroxide and 23.1% of water.

Example 5

100 parts by weight of 70% caustic was heated to 90° C. and 50 parts of technical sodium chlorite added. The mixture was then heated to 150° C. for 30 minutes, cooled, and flaked. On analysis the product showed 33.2% of sodium chlorite, 46.8% of sodium hydroxide and 20% of water.

Example 6

A mixture was prepared by a procedure similar to that described in Example 1, which contained 70% caustic, 11% technical sodium chlorite and and 19% water.

Example 7

75 parts by weight of caustic, 17 parts of water and 8 parts of technical sodium chlorite were combined in a flaked product according to the procedure of Example 1.

Example 8

A satisfactory mixture may be prepared by a procedure similar to that described in Example 1 containing about 70% potassium hydroxide, 10% technical sodium chlorite and 20% water.

I claim:

1. A solid composition consisting essentially of a hydrated alkali metal hydroxide of the group consisting of sodium hydroxide and potassium hydroxide and a relatively smaller amount of an alkali metal chlorite of the group consisting of sodium chlorite and potassium chlorite, the chlorite being uniformly fixed in the water of hydration of the hydroxide.

2. A composition of claim 1 consisting essentially of the following ingredients in about the indicated proportions by weight:

| | Per cent |
|---|---|
| Hydroxide | 45–80 |
| Water | 15–25 |
| Chlorite | 5–30 |

3. A solid composition consisting essentially of hydrated sodium hydroxide and sodium chlorite in proportions by weight of about 2:1, the chlorite being uniformly fixed in the water of hydration of the hydroxide.

JAMES DOUGLAS MacMAHON.

REFERENCES CITED

The following references are of record in the file of this patent:

UNITED STATES PATENTS

| Number | Name | Date |
|---|---|---|
| 1,339,783 | North | May 11, 1920 |
| 2,193,569 | Seaton | Mar. 12, 1940 |
| 2,364,993 | Meyer | Dec. 12, 1944 |